US 9,348,701 B2

(12) United States Patent
Foti (10) Patent No.: US 9,348,701 B2
(45) Date of Patent: May 24, 2016

(54) METHOD AND APPARATUS FOR FAILURE RECOVERY IN A MACHINE-TO-MACHINE NETWORK

(71) Applicant: Telefonaktiebolaget L M Ericsson (publ), Stockholm (SE)

(72) Inventor: George Foti, Dollard des Ormeaux (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 179 days.

(21) Appl. No.: 14/072,090

(22) Filed: Nov. 5, 2013

(65) Prior Publication Data

US 2015/0127976 A1    May 7, 2015

(51) Int. Cl.

| | |
|---|---|
| *G06F 11/00* | (2006.01) |
| *G06F 11/14* | (2006.01) |
| *A63B 57/00* | (2015.01) |
| *G06F 11/07* | (2006.01) |
| *H04W 4/00* | (2009.01) |
| *H04L 29/14* | (2006.01) |

(52) U.S. Cl.
CPC ............ *G06F 11/1412* (2013.01); *A63B 57/00* (2013.01); *G06F 11/07* (2013.01); *H04L 69/40* (2013.01); *H04W 4/005* (2013.01)

(58) Field of Classification Search
CPC ..... G06F 11/1412; G06F 11/07; H04L 69/40; H04W 4/005
USPC .......................................................... 714/20
See application file for complete search history.

(56) References Cited

U.S. PATENT DOCUMENTS

| | | | |
|---|---|---|---|
| 7,466,810 B1 | 12/2008 | Quon et al. | |
| 8,341,014 B2 | 12/2012 | Bobak et al. | |
| 2007/0244937 A1 | 10/2007 | Flynn et al. | |
| 2012/0207015 A1 | 8/2012 | Marsico | |
| 2013/0013555 A1 | 1/2013 | Foti | |
| 2014/0221032 A1* | 8/2014 | Yang .............................. | 455/509 |

FOREIGN PATENT DOCUMENTS

| | | |
|---|---|---|
| WO | 2006128792 A1 | 12/2006 |
| WO | 2011086539 A1 | 7/2011 |
| WO | 2011116087 A2 | 9/2011 |
| WO | 2013030742 A1 | 3/2013 |

OTHER PUBLICATIONS

Author Unknown, "Overview of ETSI M2M Architecture," Welcome to the World of Standards; ETSI World Class Standards; Presented by Barbara Pareglio; Ericsson. Oct. 2011. pp. 1-20.

* cited by examiner

*Primary Examiner* — Yair Leibovich
(74) *Attorney, Agent, or Firm* — Murphy, Bilak & Homiller, PLLC (57) ABSTRACT

According to one aspect of the teachings herein, a Network Services Capability Layer or NSCL is configured to initiate failure recovery responsive to detecting an abnormal reset at the NSCL. Failure recovery operations exploit recovery information that is maintained by the NSCL in a persistent data store during normal operation, e.g., on an ongoing basis, in real-time as new M2M registrations or other M2M information changes occur at the NSCL. Such operations advantageously permit the NSCL to recover missing or corrupted information after the abnormal reset, from M2M entities identified from the recovery information.

20 Claims, 10 Drawing Sheets

METHOD AND APPARATUS FOR FAILURE RECOVERY IN A MACHINE-TO-MACHINE NETWORK

TECHNICAL FIELD

The present invention generally relates to Machine-to-Machine (M2M) networks and particularly relates to failure recovery in M2M networks.

BACKGROUND

Machine-to-Machine, M2M, networks and the M2M services supported by such networks represent an increasing area of interest and importance. While they should be understood as non-limiting examples in the context of this disclosure, the European Telecommunications Standards Institute, ETSI, provides a number of detailed technical specifications relating to M2M networks, including: TS 102 689, Machine-to-Machine communications (M2M); M2M service requirements; TS 102 690, Machine-to-Machine communications (M2M); Functional architecture; TS 102 921, Machine-to-Machine communications (M2M); mIa, dIa and mId interfaces; and TR 102 725. Machine-to-Machine communications (M2M); Definitions.

M2M networks include a number of different M2M entities, including Device Applications or DAs, Device Services Capability Layers or D-SCLs, Gateway Applications or GAs, Gateway SCLs or G-SCLs, and Network Applications or NAs, and Network SCLs or N-SCLs. In general, SCLs are an M2M concept standardized by ETSI. An SCL is an abstraction layer where common functionalities are implemented to serve various M2M applications, maintain M2M application data, etc. The N-SCL or NSCL in particular is an important entity, residing at the core of the M2M network hierarchy and generally holding registration information and other configuration and operation data associated with the various M2M entities that are registered with the NSCL and communicate via the NSCL.

In practice, the NSCL is instantiated by a computer system, e.g., one or more servers, which may be referred to as a "network node" or "NSCL node". If the network node hosting the NSCL crashes because of a software or hardware fault, power loss, or other abnormal event, the network node must reset, including re-instantiation of the NSCL. However, as a general proposition, the overall "state" of the NSCL as existent immediately prior to the crash will be lost. For example, M2M registrations and associated registration information maintained at the NSCL prior to the crash generally will be lost, as will information about M2M collections, M2M data, etc.

SUMMARY

According to one aspect of the teachings herein, a Network Services Capability Layer or NSCL is configured to initiate failure recovery responsive to detecting an abnormal reset at the NSCL. Failure recovery operations exploit recovery information that is maintained by the NSCL in a persistent data store during normal operation, e.g., dynamically updated to reflect ongoing changes to Machine-to-Machine, M2M, resource information at the NSCL during normal operations. Such safeguarding of M2M resource information advantageously permits the NSCL to recover missing or corrupted resource information after the abnormal reset, using M2M entity identifiers and Point-of-Contact, POC, information maintained in the recovery information.

In one example, a method of failure recovery for an NSCL an M2M network is implemented at a network node hosting the NSCL. The method includes safeguarding M2M resource information at the NSCL, by dynamically maintaining recovery information in a persistent data store, to include identifiers and Point-of-Contact, POC, information for those M2M entities associated with the M2M resource information. The method further includes triggering a failure recovery process responsive to detecting an abnormal reset at the NSCL.

The failure recovery process includes recovering missing resource information based on retrieving the recovery information from the persistent data store and evaluating the M2M resource information, as existing at the NSCL after the abnormal reset, with respect to the recovery information, to identify missing M2M resource information. Correspondingly, the method includes contacting those M2M entities indicated by the recovery information as being associated with the missing M2M resource information, to recreate the missing M2M resource information at the NSCL.

In an example implementation, the M2M resource information for which recovery information is stored by the NSCL in the persistent data store comprises any one or more of registration resources, collections and collection attribute resources, and groupings resources, and their attributes. Corresponding recovery information comprises at least one of identifiers and POC information for applications and SCLs registered at the NSCL, identifiers, including resource identifier, and resource creator identity, and POC information for the M2M entities associated with collections created or announced at the NSCL, and identifiers, including resource identifier, and resource creator identity, and POC information for the M2M entities associated with resource groupings at the NSCL.

Further, in at least some embodiments, the method includes maintaining verification data in the persistent data store, for use in recovering corrupted M2M resource information after an abnormal reset at the NSCL. In an example implementation, the verification data comprises Cyclic Redundancy Check, CRC, or other such values, which are dynamically maintained in the verification data for the respective ones of the M2M resources represented in the recovery information. In this manner, the NSCL evaluates the M2M resource information that remains at the NSCL after the abnormal reset, based computing a verification value for each remaining resource item and comparing that computed verification value with the corresponding stored verification value. A mismatch between the compared verification values indicates that the resource item as held at the NSCL is corrupt.

In a corresponding example, a network node is configured to perform failure recovery for an NSCL in an M2M network and includes a communication interface and a processing circuit. The communication interface is configured for exchanging signaling between the NSCL and other M2M entities in the M2M network, and the processing circuit is operatively associated with the communication interface and configured to instantiate the NSCL, e.g., by providing the run-time environment in which the NSCL runs, and by executing the program code which defines the NSCL and its operations.

The processing circuit, e.g., via appropriate configuration of the NSCL, is further configured to safeguard M2M resource information at the NSCL, by dynamically maintaining recovery information in a persistent data store. The recovery information comprises all needed identifiers and POC information for those M2M entities associated with the M2M resource information being safeguarded. The processing circuit is further configured to trigger a failure recovery process responsive to detecting an abnormal reset at the NSCL.

Failure recovery processing includes recovering missing or corrupt information, based on the processing circuit being configured to retrieve the recovery information and verification data from the persistent data store, evaluate the M2M resource information, as existing at the NSCL after the abnormal reset, with respect to the recovery information and verification data, to identify missing or corrupt M2M resource information. The processing circuit is further configured to contact those M2M entities indicated by the recovery information as being associated with the missing M2M resource information, to recreate the missing or corrupt M2M resource information at the NSCL.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIGS. 5-9A/9B are signal flow diagrams of example signal flows and corresponding processing involving an NSCL before, during and after failure recovery.

DETAILED DESCRIPTION

Figure 1:
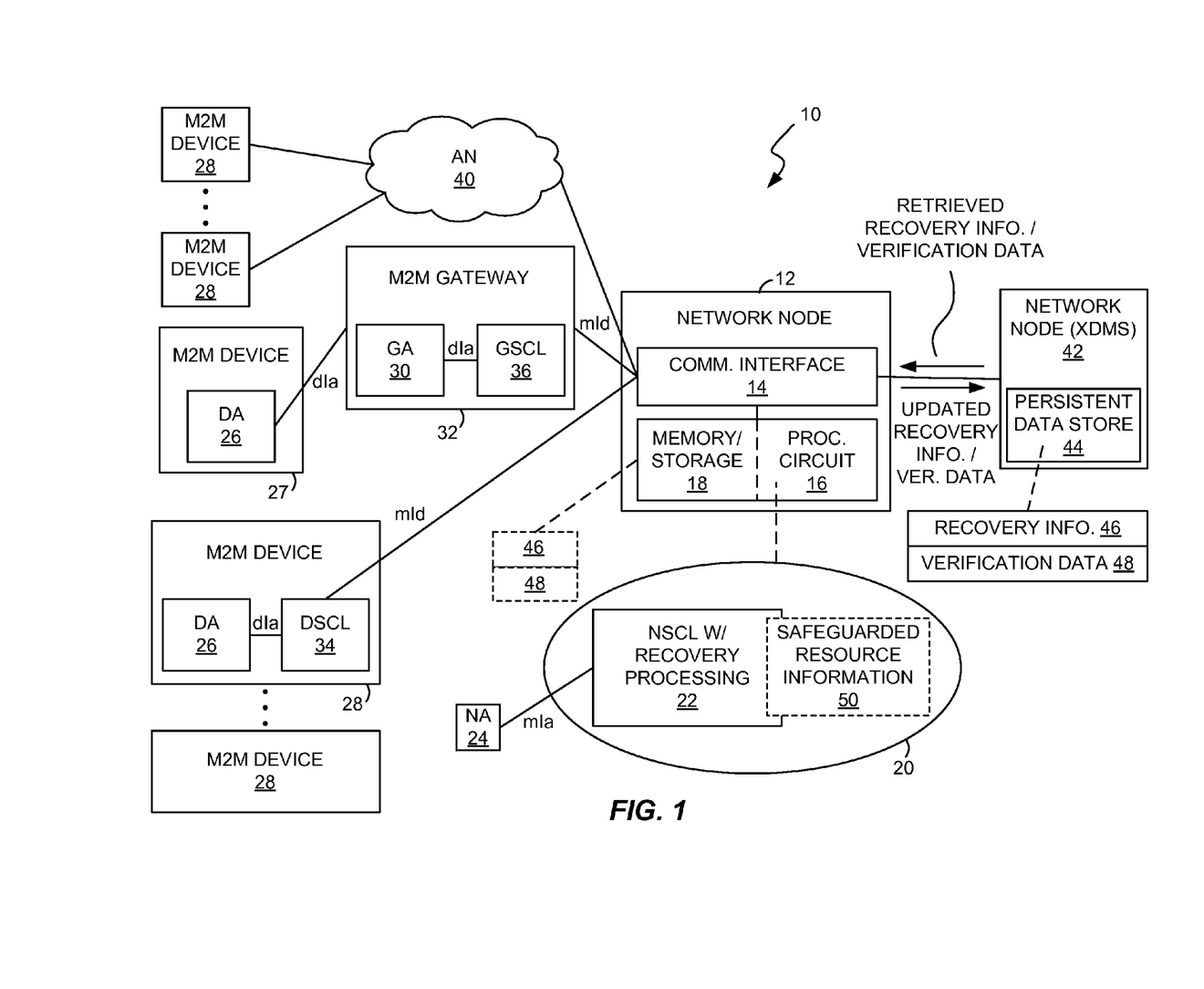
FIG. 1 is a block diagram of one embodiment of a Machine-to-Machine, M2M, network that includes a network node and Network Services Capability Layer, NSCL, configured according to the failure recovery teachings presented herein.

FIG. 1 illustrates a Machine-to-Machine, M2M, network 10, referred to hereafter simply as "network 10." M2M networks are subject to significant variation and the illustrated network 10 shall be understood as a non-limiting example that is useful in the sense that it introduces some of the possible types of M2M entities that may be included in the network 10, along with depicting the various functional and/or physical interconnections between such entities.

In particular, one sees a network node 12, which may be a single computer system, such as a server, or which may be more than one system or server cooperating together as the depicted network node 12. The network node 12, or simply "node 12", includes a communication interface 14, a processing circuit 16, and memory/storage 18, and it provides a run-time environment 20 in which an M2M Network Services Capability Layer, NSCL, 22 is instantiated. Among other types of M2M entities that communicate with or through the NSCL 22, there may be one or more M2M Network Applications, NAs, 24 that connect to the NSCL 22 via mla interfaces. It should also be noted that the there may be any number of M2M resources maintained in conjunction with the NSCL 22, which are not shown explicitly in the diagram but which may include tables or other data structures that are owned or otherwise maintained by one or more M2M entities in the network 10.

As regards various examples of such entities, one sees one or more M2M Device Applications, DAs, 26 running in respective M2M devices 28. Such devices may be dedicated M2M devices, or may be multipurpose devices that host one or more DAs 26. The various M2M entities also may include M2M Gateway Applications, GAs, 30, running on one or more M2M Gateways 32. The reader will also note that the M2M devices 28 include an M2M Device Services Capability Layer, D-SCL, 34 and, similarly, each Gateway 32 provides a Gateway SCL or G-SCL 36. There may be any number of devices 28 and at least some of those devices may connect through an access network 40, e.g., through a cellular network such as a Third Generation Partnership Project, 3GPP, network. There also may be other M2M devices 27, which connect through a respective one of the one or more Gateways 32. While these devices are similar to the devices 28, they do not host a D-SCL 34, and instead use the G-SCL 36 of the Gateway 32 to which they are connected.

The network 10 may include, or may be communicatively coupled to, one or more other nodes, such as the node 42 illustrated in FIG. 1. In an example case, the node 42 is configured as an eXtensible Markup Language, XLM Document Management Server, XDMS, which may be abbreviated as "XDMS". The node 42 includes a persistent data store 44 that in one embodiment is used by the node 12 to store recovery information 46 for the NSCL 22. Additionally, or alternatively, the node 12 includes persistent data storage within the aforementioned memory/storage 18 and the recovery information 46 is stored therein.

In at least some embodiments, the NSCL 22 maintains verification data 48. The verification data 48 may be stored as part of the recovery information 46 in the node 42 and/or memory/storage 18, or it may be stored separately in either or both nodes. During normal "live" operation NSCL 22, M2M resource information 50 will be dynamically maintained. For purposes of this discussion, the M2M resource information 50 at least includes one or more of: registration resources for applications and SCLs registered at the NSCL 22; collection and collections attributes resources for collections created or announced at the NSCL 22; and groupings resources and their attributes at the NSCL 22 as well as the NSCL own data.

When the NSCL 22 undergoes an abnormal reset—e.g., after a software crash, power interruption, etc.—it may have retained some or all of the resource information 50. The verification data 48 provides an advantageous basis for the NSCL 22 to verify the integrity of any resource information 50 remaining at the NSCL 22 after an abnormal reset. In turn, for any remaining resource information 50 that is determined to be corrupted, the NSCL 22 uses corresponding records or entries in the recovery information 46, to obtain the needed identifiers and POC information of the associated M2M entities, and contacts those identified M2M entities to recreate the corrupted information at the NSCL 22. Further, the recovery information 46 enables the NSCL 22 to identify and recover any missing resource information—i.e., particular resource items that, according to the recovery information 46 should be present in the resource information 50 but are missing. Correspondingly, NSCL 22 uses the recovery information 46 to obtain the identifiers and POC information for those M2M entities indicated by the recovery information 46 as being associated with the missing information, to recreate the missing information at the NSCL 22.

In an example embodiment, the network node 12 is configured to perform failure recovery for the NSCL 22. For example, the NSCL 22 itself can be programmed to perform failure recovery as part of its post-failure restart operations. In support of such operations, the communication interface 14 is configured for exchanging signaling between the NSCL 22 and other M2M entities in the network 10, e.g., entities 24, 26, 30, 34 and 36. Further, the processing circuit 16, which is operatively associated with the communication interface 14, is configured to instantiate the NSCL 22, maintain recovery information 46 and, in at least some embodiments, verification data 48, for the NSCL 22 in a persistent data store, e.g., store 18 or 44. Hereafter, the discussion will refer to "persistent data store 44" but it should be understood that, unless noted, the memory/storage 18 in the node 12 also may be used as a persistent data store in addition to or as an alternative to the persistent data store 44.

In an example implementation, the network node 12 comprises a communication interface 14 that is configured for exchanging signaling between the NSCL 22 and other M2M entities in the M2M network 10. Example M2M entities include network applications 24, device applications 26, gateway applications 30, device SCLs 34 and gateway SCLs 36.

The network node 12 further includes a processing circuit 16 that is operatively associated with the communication interface 14 and configured to instantiate the NSCL 22. The processing circuit 16 is further configured to safeguard M2M resource information 50 at the NSCL 22, by dynamically maintaining recovery information 46 in a persistent data store 44, to include needed identifiers and POC information for those M2M entities associated with the M2M resource information 50. In this sense, the "associated" M2M entities may be those M2M entities in the M2M network 10 that own or are represented by the individual resource items comprising the M2M resource information 50. Further, here and elsewhere in the description where it is said that the processing circuit 16 is configured to do something, such language in one or more embodiments denotes a programmatic configuration of the NSCL 22 that is realized based on the underlying execution of stored computer program instructions by the processing circuit 16. Of course, the processing circuit 16 may comprise one or more digital processors, e.g., in a single computer system or in two or more cooperating computer systems.

In any case, the processing circuit 16 is configured to trigger a failure recovery process responsive to detecting an abnormal reset at the NSCL 22. The failure recovery process includes recovering missing information, based on the processing circuit 16 being configured to retrieve the recovery information 46 from the persistent data store 44, and evaluate the M2M resource information 50, as existing at the NSCL 22 after the abnormal reset, with respect to the recovery information 46, to identify missing M2M resource information. For example, each resource item at the NSCL 22 that was being safeguarded will have one or more corresponding entries or records within the recovery information 46. Thus, to the extent that the M2M resource information 50 as held by the NSCL 22 after the abnormal reset does not have resource items for all of the entries in the recovery information 46, those resource items can be said to be resource information missing from the NSCL 22.

Correspondingly, the processing circuit 16 is configured to contact those M2M entities indicated by the recovery information 46 as being associated with the missing M2M resource information, to recreate the missing M2M resource information at the NSCL 22. For example, for each missing resource item, the recovery information 46 will contain the relevant identifiers and POC information for contacting the M2M entities associated with the missing information, and the NSCL 22 can therefore use that information to contact those entities, to prompt them to perform whatever operations are needed to recreate the missing information at the NSCL 22. In an example case, the NSCL 22 determines that it is missing a device SCL registration and it uses the corresponding entry in the recovery information 46 to contact the device SCL 34, to prompt re-registration by the device SCL 34 with the NSCL 22. The same general approach can be used to recreate collection and collection attribute resources at the NSCL 22, and likewise for grouping resources, etc.

In at least some embodiments, the processing circuit 16 is further configured to dynamically maintain verification data 48 in the persistent data store 44 for the M2M resource information 50, based on maintaining verification values for the M2M resource information 50. In such embodiments, the failure recovery process further includes recovering corrupted M2M resource information, based on the processing circuit 16 being configured to retrieve the verification data 48 from the persistent data store 44 and evaluate the resource information 50, as existing at the NSCL 22 after the abnormal reset, with respect to the verification data 48, to identify corrupted M2M resource information within the M2M resource information 50. The processing circuit 16 is further configured to contact those M2M entities indicated by the recovery information 46 as being associated with the corrupted M2M resource information, to recreate the corrupted M2M resource information at the NSCL 22.

In an example implementation, the verification data 48 comprises individual stored verification values, each corresponding to a respective resource item safeguarded by the recovery information 46. Here, the processing circuit 16 is configured to evaluate the resource information 50 for recovering corrupted M2M resource information by, for each such resource item remaining in the M2M resource information 50 at the NSCL 22 after the abnormal reset, computing a verification value and identifying the remaining resource item as corrupted when the computed verification value does not match the corresponding stored verification value.

Cyclic Redundancy Check, CRC, or other such values may be used as the individual verification values. For example, for a given M2M resource that is part of the live operational data being maintained by the NSCL 22 in the M2M resource information 50, the NSCL 22 computes a CRC and stores that as a corresponding entry in the verification data 48. The NSCL 22 may use a record or entry identifier that links the entry to corresponding identifier and POC information in the recovery information 46, or implement some other mechanism for maintaining a correspondence between individual safeguarded resource items and their corresponding entries in the recovery information 46 and verification data 48.

In simple terms, the recovery information 46 enables the NSCL 22 to identify whether it is missing any resource items that it was safeguarding before the failure event that resulted in the abnormal restart, and to contact the M2M entities associated with those missing resource items. On the other hand, the individual verification values comprising the verification data 48 enables the NSCL 22 to verify the integrity of individual ones of those resource items that remain in the M2M resource information 50 held by the NSCL 22 after the abnormal reset.

To the extent that the NSCL 22 determines that such a resource item is corrupted, the recovery information 46 identifies the involved M2M entity/entities, and provides their corresponding POC information, thereby enabling the NSCL 22 to contact the involved M2M entities and thereby recreate the corrupted information. Here, recreating the corrupted information can be understood as obtaining un-corrupted copies of the information in question from the involved M2M entity/entities, or otherwise prompting such entities to perform whatever operations are needed to restore such information in uncorrupted form at the NSCL 22.

A number of approaches for storing the recovery information 46 are contemplated. In some embodiments, the processing circuit 16 is configured to maintain the recovery information 46 for the NSCL 22 in the persistent data store 44 by maintaining an eXtensible Mark-up Language, XML, document in the persistent data store 44. For example, the processing circuit 16 in such embodiments is configured to maintain the XML document in the persistent data store 44 by updating the XML document in the persistent data store on a triggered or periodic basis, so that the recovery information 46 substantially always matches the then-current M2M resource information 50 at the NSCL 22.

For the case where the persistent data store 44 is in an external second network node 42, the processing circuit (16) is configured to maintain the XML document based on at least one of: posting updated copies of the XML document to the second network node 42 on a triggered or periodic basis, to reflect changes in the M2M resource information 50 at the NSCL 22; and signaling such changes to the second network node 42, for use by the second network node 42 in updating the XML document.

Further, in one or more embodiments, the processing circuit 16 is configured to maintain the XML document in the persistent data store 44 by maintaining two or more XML documents that are segregated according to schema or type. For example, the processing circuit 16 is configured to maintain two or more XML documents that are segregated according to schema or type, based on maintaining a first XML document for failure recovery with respect to registrations existing at the NSCL 22 at the time of the failure event, and maintaining a second XML document for failure recovery with respect to collections and their corresponding attributes and/or groupings as well as the NSCL's own data existing at the NSCL 22 at the time of the failure event.

In that regard, the M2M resource information 50 in some embodiments comprises any one or more of registration resources, collections and collection attributes resources, and groupings resources, as well as NSCL's own data. The recovery information 46 correspondingly comprises at least one of: identifiers and POC information for applications and SCLs registered at the NSCL 22, identifiers, including resource identifier, and resource creator identity, and POC information for the M2M entities associated with collections created or announced at the NSCL 22, and identifiers, including resource identifier, and resource creator identity, and POC information for the M2M entities associated with resource groupings at the NSCL 22. Note that the NSCL's own data may simply be backed up.

Broadly, then, it will be understood that the NSCL 22, e.g., via configuration of the processing circuit 16, is configured to maintain M2M resource information 50 during normal operations, and to safeguard that information by dynamically updating corresponding recovery information 46 in the persistent data store 44, e.g., in real time, to reflect ongoing changes to the M2M resource information 50. Further, the NSCL 22 may be configured to maintain verification data 48 to determine whether any of the M2M resource information 50 it holds after an abnormal reset is "good." Recovery is skipped for good data. Thus, the recovery information 46 and verification data 48 can be used as described above by the NSCL 22, to implement a robust yet efficient failure recovery process. Here it should be noted that "real time" does not necessarily denote instantaneous updating whenever any change occurs, but rather indicates that the NSCL updates the recovery information 46, and any verification data 48 being maintained, as part of its ongoing, normal operations, and does so in a manner so that the recovery information 46 substantially reflects the current contents or state of the M2M resource information 50.

Hence, updating can be done on a triggered basis, responsive to any changes or additions of the type tracked in the recovery information 46. Alternatively, updating can be batched, e.g., the NSCL 22 periodically determines whether any changes have occurred in the most recent interval, and updates the recovery information 46 and any corresponding verification data 48, as needed. Hybrid approaches may be used also, e.g., where updating is triggered after accumulating a certain number of changes and/or after a certain time interval has lapsed.

Figure 2:
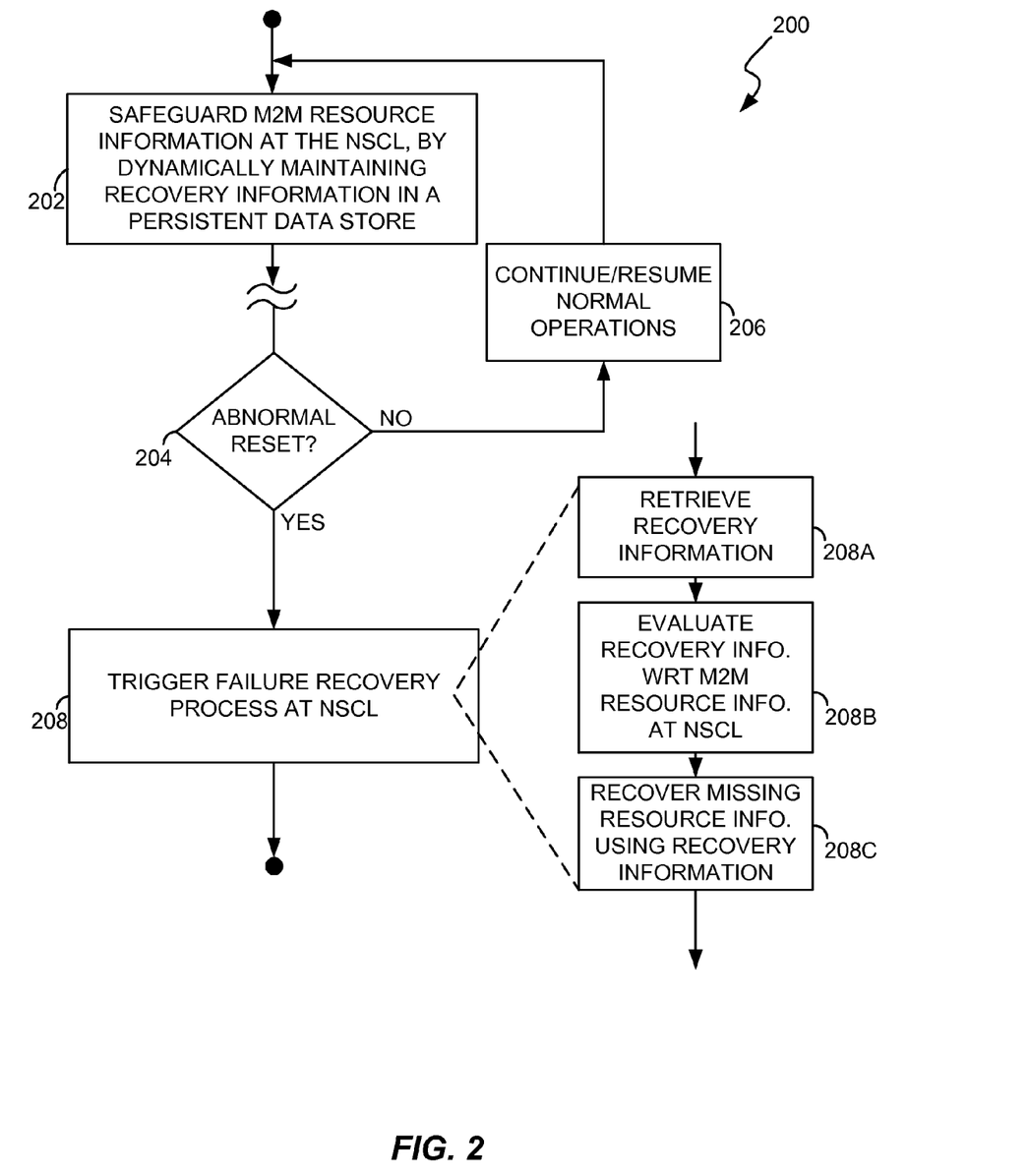
FIG. 2 is a logic flow diagram of one embodiment of a method of failure recovery processing at a network node hosting an NSCL.

FIG. 2 illustrates a method 200 of failure recovery for the NSCL 22, such as may be implemented by the node 12. The method 200 includes safeguarding (Block 202) M2M resource information 50 at the NSCL 22, by dynamically maintaining recovery information 46 in a persistent data store 44, to include identifiers and POC information for those M2M entities associated with the M2M resource information 50. By way of example, such entities include any one or more of network applications 24, device applications 26, gateway applications 30, device SCLs 34 and gateway SCLs 36.

The method 200 further includes triggering (Block 208) a failure recovery process responsive to detecting (Block 204) an abnormal reset at the NSCL 22. The contemplated failure recovery process includes recovering missing information (Block 208C), based on retrieving the recovery information 46 (Block 208A) from the persistent data store 44 and evaluating the M2M resource information 50 (Block 208B), as existing at the NSCL 22 after the abnormal reset, with respect to the recovery information 46, to identify missing M2M resource information.

In other words, after the abnormal reset, the NSCL 22 may have retained all or at least some of the M2M resource information 50 it held before the failure event giving rise to the abnormal reset. Correspondingly, the recovery information 46 comprises a set of records, entries or items representing the M2M resource information 50 being safeguarded before the failure event. Therefore, by comparing the resource items existing in the post-reset M2M resource information with the entries in the recovery information 46, the NSCL 22 can identify missing resource items—i.e., by identifying an entry in the recovery information 46 and finding no corresponding resource item within the M2M resource information 50, as existing after the abnormal reset.

The failure recovery process includes contacting those M2M entities indicated by the recovery information 46 as being associated with the missing M2M resource information, to recreate the missing M2M resource information at the NSCL 22. Note that if the NSCL 22 detects that the current reset is not an abnormal reset but rather a normal start—whether initial or subsequent—then the NSCL 22 does not perform failure recovery processing and instead starts or resumes normal operations. Of course, as is contemplated herein, those normal operations include safeguarding M2M resource information 50 during normal operations, via maintaining the recovery information 46 and, in at least some embodiments, via the verification data 48.

Figure 3:
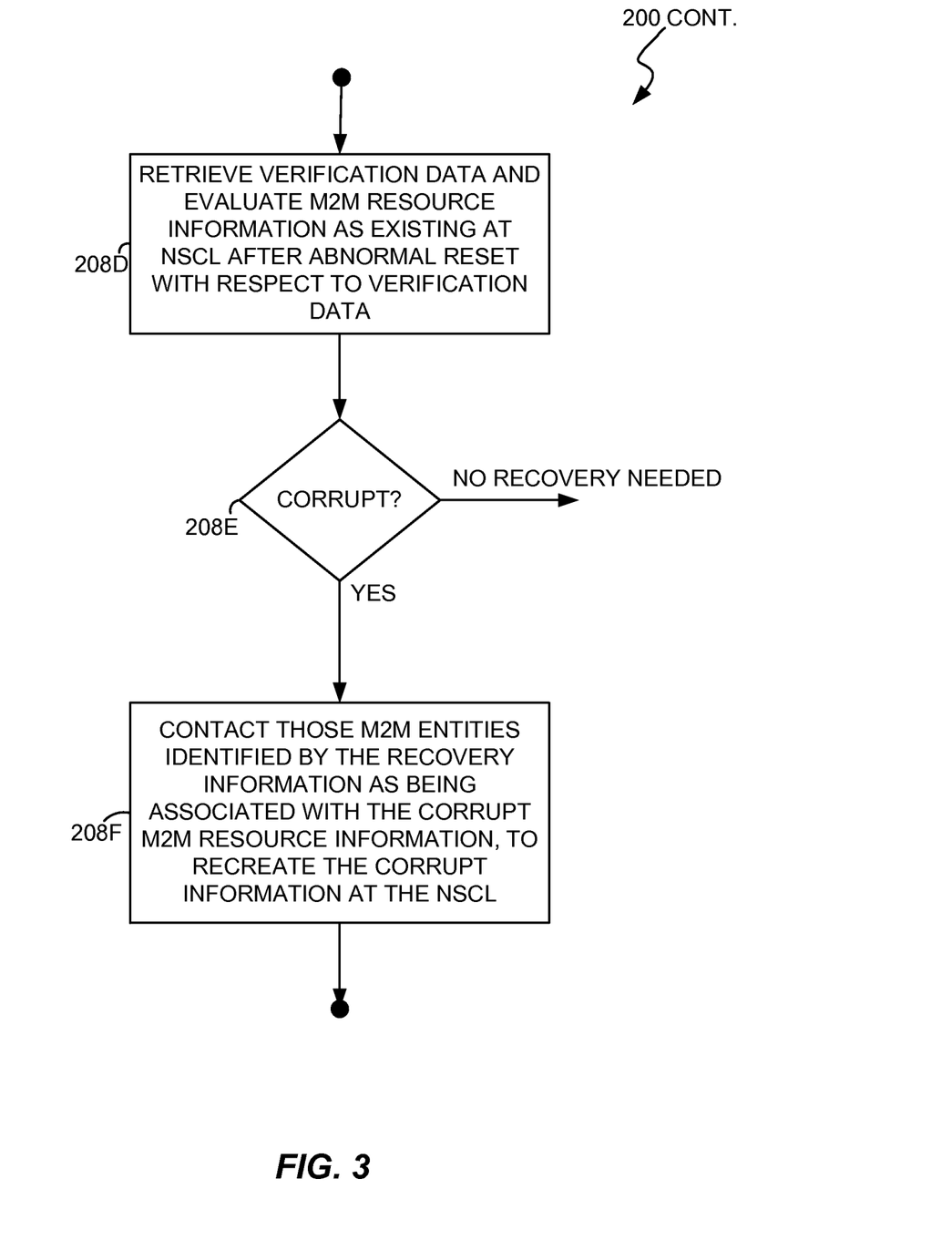
FIG. 3 is a logic flow diagram of further example details for the failure recovery method of FIG. 2.

In that regard, FIG. 3 illustrates verification-related processing in embodiments of the failure recovery process that include restoration of corrupted data. In such embodiments, the method 200 further includes dynamically maintaining verification data 48 in the persistent data store 44 for the M2M resource information 50, based on maintaining verification values for the M2M resource information 50.

In an example embodiment, verification-related failure recovery processing includes recovering corrupted M2M resource information based on retrieving the verification data 48 from the persistent data store 44 and evaluating the M2M resource information, as existing at the NSCL 22 after the abnormal reset, with respect to—WRT—the verification data 48, to identify corrupted M2M resource information within the M2M resource information 50 (Block 208D).

For each corrupted resource item held within the M2M resource information 50 (YES from Block 208E), the NSCL 22 contacts those M2M entities indicated by the recovery information 46 as being associated with the corrupted M2M resource information, to recreate the corrupted M2M resource information at the NSCL 22 (Block 208F). It will be understood that such process loops, iterates, or other processes through the discrete resource items comprising the M2M resource information 50, and is operative to restore individual resource items at the NSCL 22 that are determined to be corrupted.

According to an example implementation, the verification data 48 comprises individual stored verification values, each corresponding to a respective resource item safeguarded by the recovery information 46. In turn, evaluating the resource information 50 for recovering corrupted M2M resource information comprises, for each such resource item remaining in the M2M resource information 50 at the NSCL 22 after the abnormal reset, computing a verification value, and identifying the remaining resource item as corrupted when the computed verification value does not match the corresponding stored verification value.

The above processing enables pro-active failure recovery by the NSCL 22, e.g., as compared to waiting for the involved M2M entities to update a registration with the NSCL 22, to otherwise later recognize that there is a problem at the NSCL 22, since the NSCL 22 will realize that something is wrong as the registration is missing. The same sort of problem realization by the NSCL 22 will occur with respect to the other M2M resource information at the NSCL 22, such as collections-related resource information. Here, an M2M "collection" will be understood as an abstract resource that contains a collection of similar sub-resources, which are modeled together as a collection resource. Collections are thus grouping schemes for grouping resources together. So, for example, all NAs 24 that are registered at the NSCL 22 are stored in a collection called "Applications" such as shown in FIG. 4.

Figure 4:
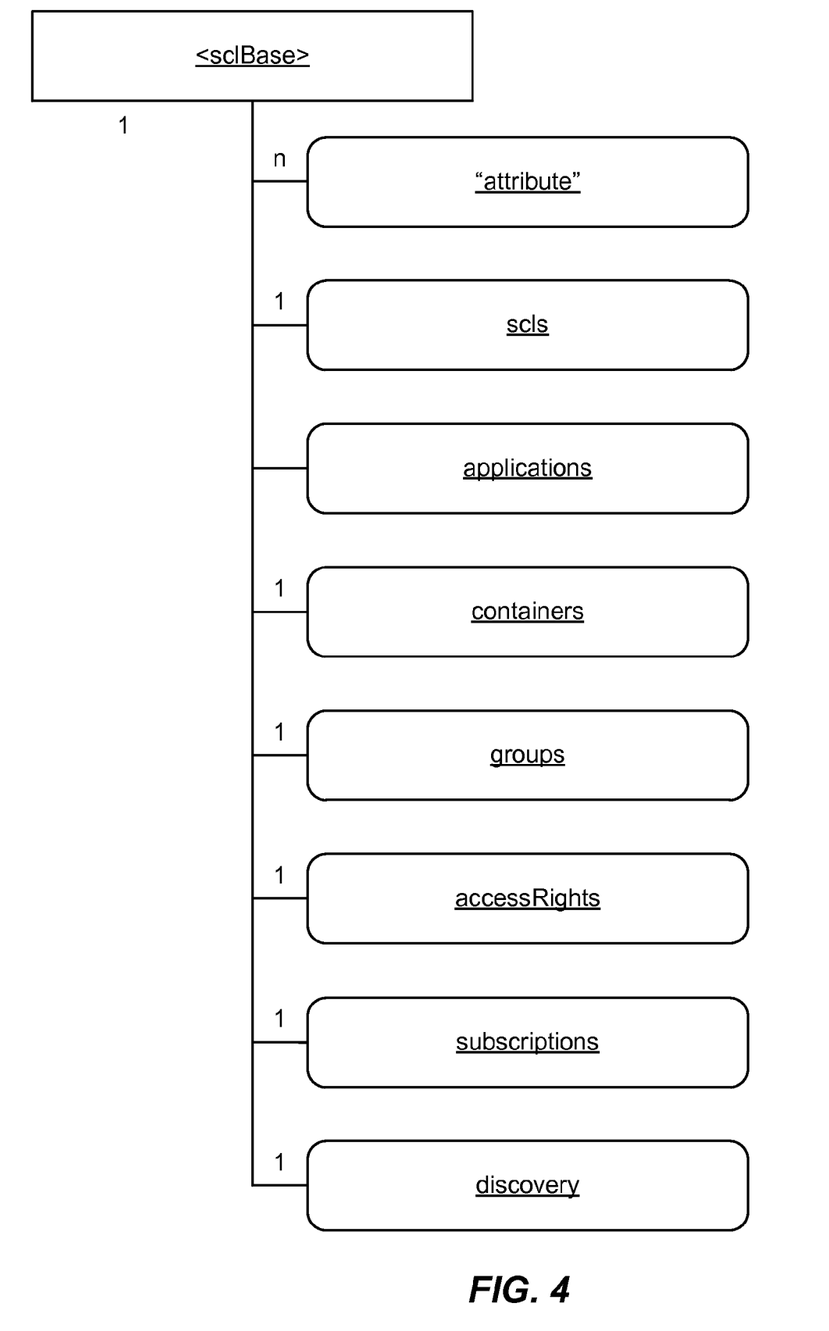
FIG. 4 is a diagram of one embodiment of a schema or structure for recovery information, for use in failure recovery at an NSCL.

FIG. 4 illustrates an example of the kinds of M2M resource information 50 stored in the NSCL 22 during normal operations, all or some of which can be safeguarded according to the teachings herein. More detailed example information can be found in TS 102 690, as identified in the Background of this disclosure. The M2M identifiers and POC information of the M2M entities associated with the data elements and types identified in FIG. 4 can be stored and maintained as the recovery information 46, by classifying them based on the cases below:

Case 1: registered SCLs, which can be M2M devices and/or M2M gateways;
Case 2: locally registered network applications registered at the NSCL 22;
Case 3: M2M data owned by the NSCL 22; and
Case 4: M2M data belonging to an SCL or an application that may or may not be registered with the NSCL 22.

The M2M resources stored in the NSCL 22, as exemplified in FIG. 4, generally fit with one of the four cases described above. For example, "attributes" and "discovery" information fit Case 3,while SCLs fit Case 1, applications fit Case 2, and groups, containers subscriptions and access rights all fit Case 4.

In operation, then, the NSCL 22 contemplated herein maintains recovery information 46 based on storing minimal information during live traffic, e.g., in an XML document, which then allows the NSCL 22 to use the recovery information 46 to recreate data lost or corrupted because of a failure—crash, etc.—at the NSCL. The recovery information 46 can be stored in the same node 12 that hosts the NSCL 22, or it can be stored at an external node 42—e.g., an XDMS. Alternatively, it can be stored locally and mirrored externally, e.g., so that the local copy is used unless found to be corrupt, or the local and mirrored copies can be compared as a verification mechanism.

Failure recovery can be understood in some embodiments as including at least two mechanisms or protocols. First, in the context of Cases 1. and 2. above, the NSCL 22 forces all previously registered SCLs and locally registered applications to re-register again whenever the NSCL 22 loses data or becomes aware of corrupt data following a reset or a crash. Forcing re-registration recreates the missing or corrupted resource information at the NSCL 22 associated with the entities that were registered at the NSCL 22 prior to the failure event. Forcing re-registration implies that the NSCL 22 must notify all such M2M entities whose resource information has been lost or has been corrupted, during failure recovery processing. Here, the recovery information 46 provides the requisite, Application-IDs, SCL-IDs and POC information for carrying out the notifications. No recovery shall be attempted for SCLs and applications whose data has not been lost or corrupted, as verified by the NSCL 22 during failure recovery processing.

For example, in one or more embodiments, the NSCL 22 is configured to detect an abnormal reset and identify those M2M entities associated with corrupted or missing resource information at the NSCL 22. To do so, the NSCL 22 evaluates the resource information that was retained at the NSCL 22 through the failure and reset and uses, e.g., corresponding verification data 48 and corresponding entries in the recovery information 46, to determine whether individual ones of these items are valid. If so, no recovery processing is performed with respect to such items and they are considered as being "good" with respect to resuming normal operations at the NSCL 22.

However, to the extent that the resource information 50 retained at the NSCL 22 is missing resource items, which the NSCL 22 can detect by comparing the resource information 50 against the recovery information 46, or where retained items are determined to be corrupted, the NSCL 22 uses the corresponding entries in the recovery information 46—i.e., the corresponding SCL-IDs, Application-IDs, and POC information, to notify the involved M2M entities using device management procedures. It is then the responsibility of the notified entity to re-register again and/or to otherwise re-create all of the resources of interest.

In one embodiment of the NSCL 22, it maintains the recovery information 46 during normal "live" operations by recording the relevant M2M Identities, for all registering SCLs/network applications, along with the POC information for the registering entities. Of course, the recovery information 46 is correspondingly updated to reflect de-registrations, re-registrations. This applies to Cases 1 and 2 as identified above.

Regarding the second failure recovery mechanism, in the context of Cases 3 and 4, as defined above, the NSCL 22 uses remote device management procedures to request that each M2M entity that previously created a resource entry in a collection existing at the NSCL 22 immediately prior to the failure re-upload all the information about that resource, if the corresponding resource item(s) at the NSCL 22 are corrupt or missing. Such processing applies, for example, to all collections under the <SCLBase> tree in FIG. 4. Attribute collection and discovery resources are backed up and retrieved if missing or corrupt. To that end, the NSCL 22 maintains specific records or entries in the recovery information 46 for each M2M resource in each defined M2M collection. In an example embodiment, the recovery information 46 includes: (1) the resource identifier; (2) the resource creator identifier, which can be a DA identifier, GA identifier, NA identifier, G-SCL identifier, D-SCL identifier (or NSCL identifier for its own data); and (3) the POC associated with the resource creator, and where that creator resides. For Cases 1. and 2, the resource identifier noted in Item (1) is not needed, but it is needed for the other cases. Once the resource owner is notified, it has to recreate the resource again using normal procedures in that regard. In at least one embodiment, the NSCL 22 maintains a separate XML document for each collection.

In a more detailed example, the recovery information 46 includes the following items for each groups Collection: the identifier for each <group> resource in the collection, the identity of the originator that created the <group> resource, and the POC information for the M2M entity, where the resource originator that created it resides; for announced groups, the identifier for each <groupAnnc> in the collection, the identity of the originator that created the <groupAnnc> resource, and the POC information for the M2M entity where the resource originator that created it resides; an entry for each subscription in the subscriptions collection included in the groups collection, including the identifier for each <subscription> in the subscriptions collection, the identity of the originator that created the <subscription> resource, and the POC information for the M2M entity, where the resource originator that created it resides. The same applies to the attribute parameter for the groups collection.

For the accessRights Collection, the NSCL 22 in one or more embodiments maintains the following items in the recovery information 46: the identifier for each <accessRight> in the collection, the identity of the originator that created the <accessRight> resource, and the POC information for the M2M entity where the resource originator that created it resides; the identifier for each <accessRightAnnc> in the collection, along with the identity of the originator that created the <accessRightAnnc> resource and the POC information for the M2M entity where the resource originator that created it resides; an entry for each subscription in the subscriptions collection included in the acccessRights Collection, including the identifier for each <subscription> in the subscriptions collection, the identity of the originator that created the <subscription> resource, and the POC information for the M2M entity where the resource originator that created it resides. The same applies to the attribute parameter for the accessRights Collection.

Similarly, for the containers Collection, the recovery information 46 may contain: the identifier for each <container> resource in the collection, the identity of the originator that created the <container> resource; and POC information for the M2M entity where the resource originator that created it resides; the identifier for each <locationContainer> in the collection, the identity, the originator that created the <locationContainer> resource, and POC information for the M2M entity where the resource originator that created it resides . The same recovery principles to the remaining <containerAnnc>, <locationContainerAnnc>, and attribute parameter elements within the containers Collection.

For the subscriptions Collection under the <SCLBase>, the recovery information 46 may be used to maintain the following: the identifier for each <subscription> resource in the collection, the identity of the originator that created the <subscription> resource, and POC information for the M2M entity where the resource originator that created it resides. For the <SCLBase> attribute and discovery resource, the recovery information 46 includes a backup.

Figure 5:
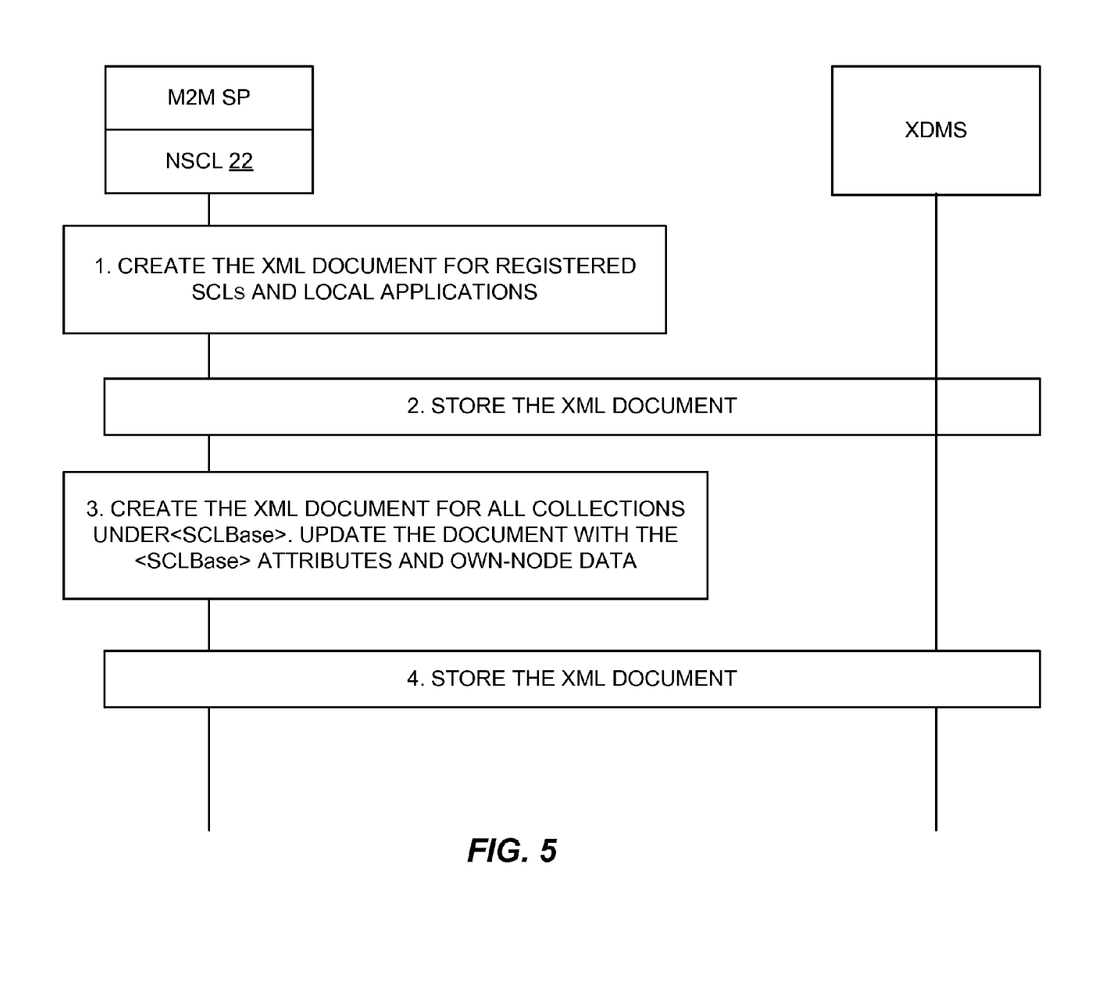

FIG. 5 is an example signal flow diagram that illustrates initialization of an XML document as the recovery information 46. In the diagram, "M2M SP" denotes the M2M Service Provider domain, in which an NSCL operates. At Step 1, the NSCL 22 creates an XML document for registered SCLs and local network applications and at Step 2. the NSCL 22 stores the XML document in the XDMS—e.g., at an external document server. At Step 3, the NSCL 22 creates another XML document for all collections under the <SCLBase>, and which includes all <SCLBase> attributes and other relevant own-node data at the NSCL such as discovery resource. At Step 4, the NSCL 22 stores the second XML document at the XDMS. Of course, the step ordering and step details are not intended to be limiting and the actual signal flow may be varied.

Figure 6:
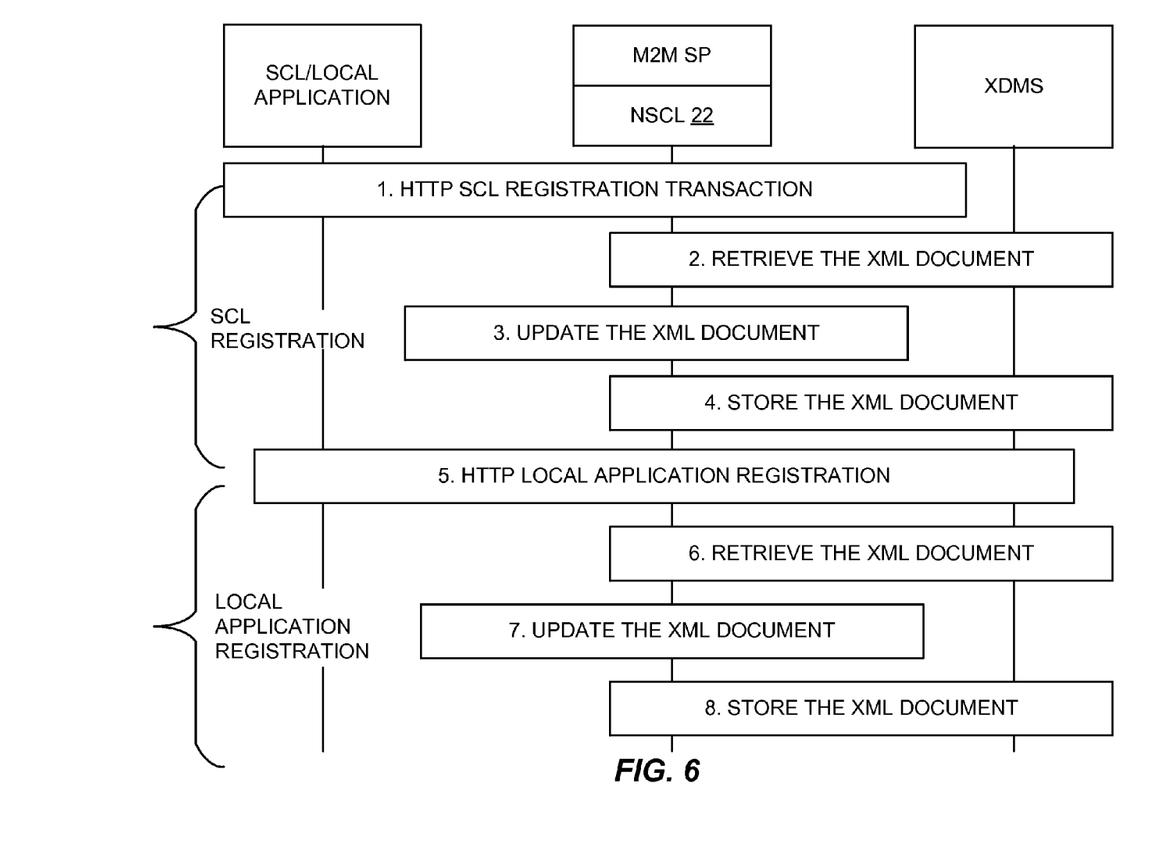

FIG. 6 illustrates an example of maintaining the recovery information 46 during "normal" operation of the NSCL 22. Steps 1-4. relate to a new SCL registration or an update to an existing SCL registration. At Step 1, a new SCL registration transaction involving the NSCL 22 occurs. In response, at Step 2, the NSCL 22 retrieves the corresponding XLM document from the XDMS, at Step 3. it updates the retrieved document, and at Step 4. it stores the updated document at the XDMS.

Steps 5-8. relate to a local network application registration. At Step 5, a local application newly registers at the NSCL 22. At Step 6, the NSCL 22 retrieves the appropriate XML document from the XDMS, updates the document at Step 7, and stores the updated document in the XDMS at Step 8.

Figure 7:
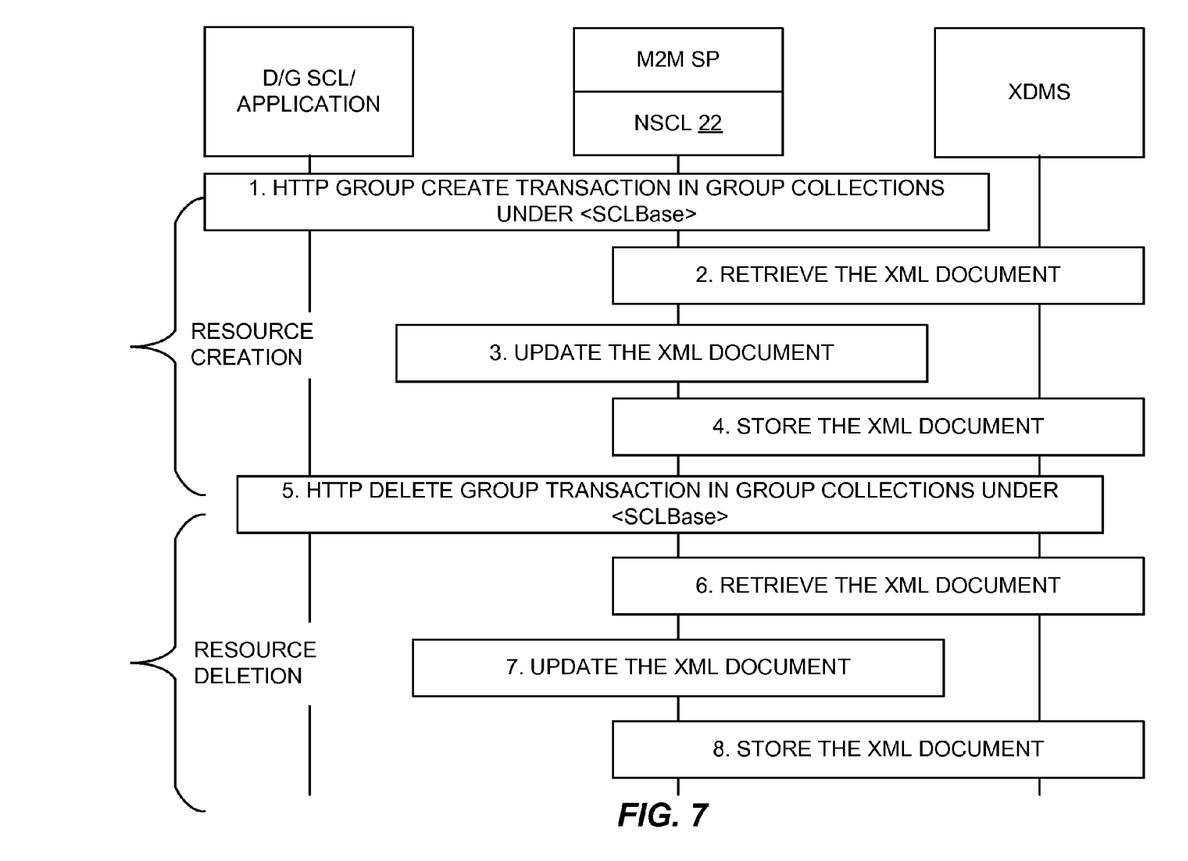

FIG. 7 illustrates an example call flow relating to maintaining updated collections information as part of the recovery information 46. Steps 1-4. relate to resource creation, while Steps 5-8. relate to resource deletion. At Step 1, a group creation transaction for a <group> occurs under the groups collection below <SCLBase>, the NSCL 22 retrieves the corresponding XML document at Step 2, updates it at Step 3, and stores the updated document in the XDMS at Step 4. At Step 5, a deletion transaction occurs, involving a <group> in the groups collections under the <SCLBase>. In response, the NSCL 22 retrieves the corresponding XML document at Step 6, updates the document at Step 7, and stores the updated document at Step 8.

Figure 8:
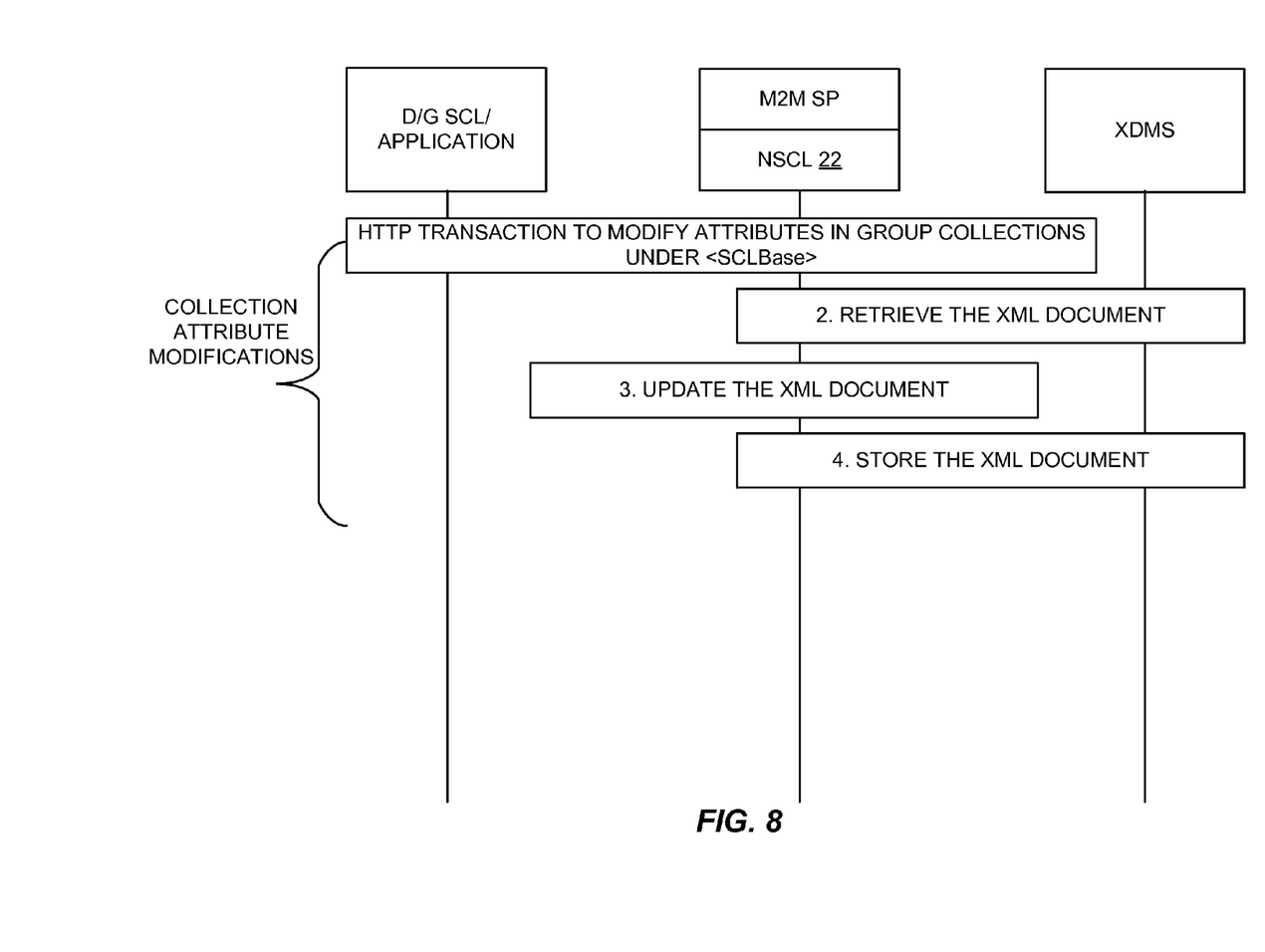

FIG. 8 illustrates an example related to collection attribute modifications. At Step 1, a transaction occurs, involving the modification of one or more attributes in group collections under the <SCLBase>. The NSCL 22 retrieves the corresponding XML document at Step 2, updates the document to reflect the change(s) at Step 3, and stores the updated document at Step 4.

Figure 9A:
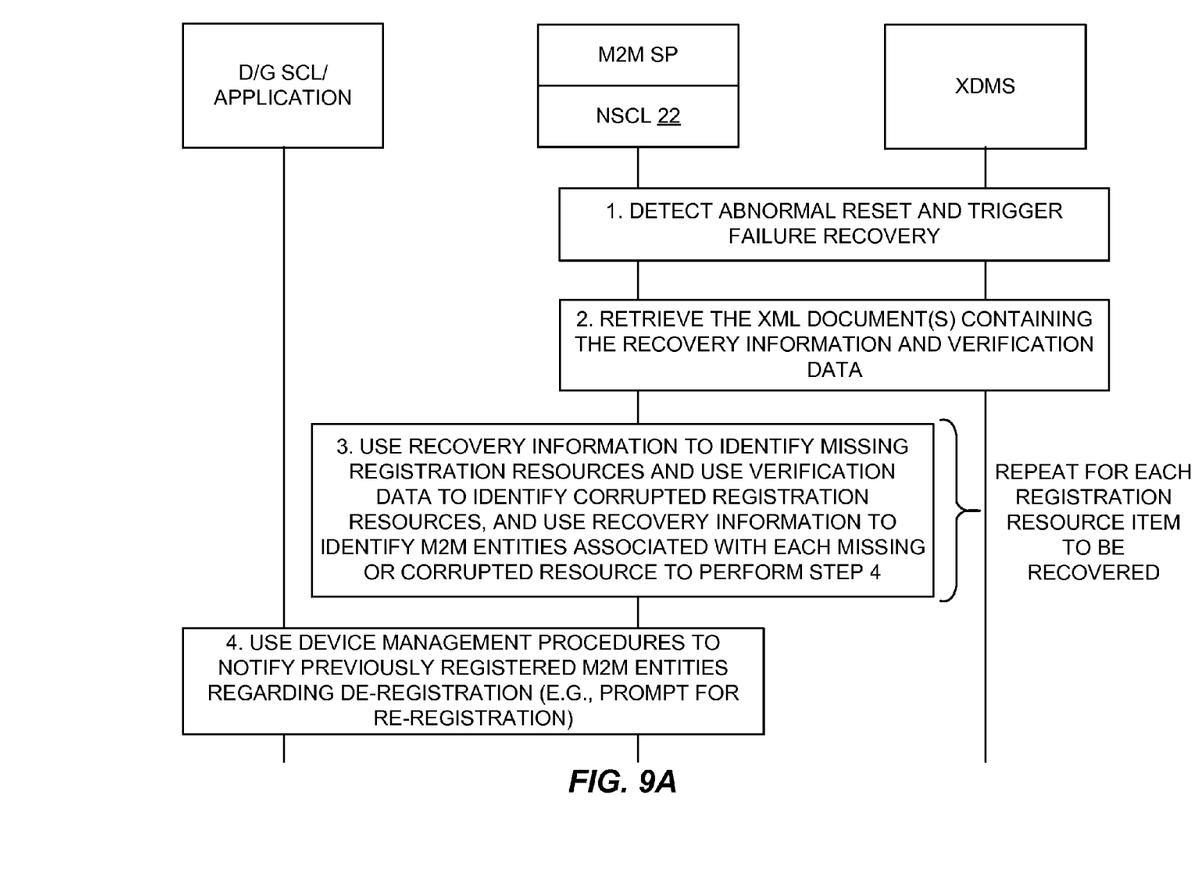
Figure 9B:
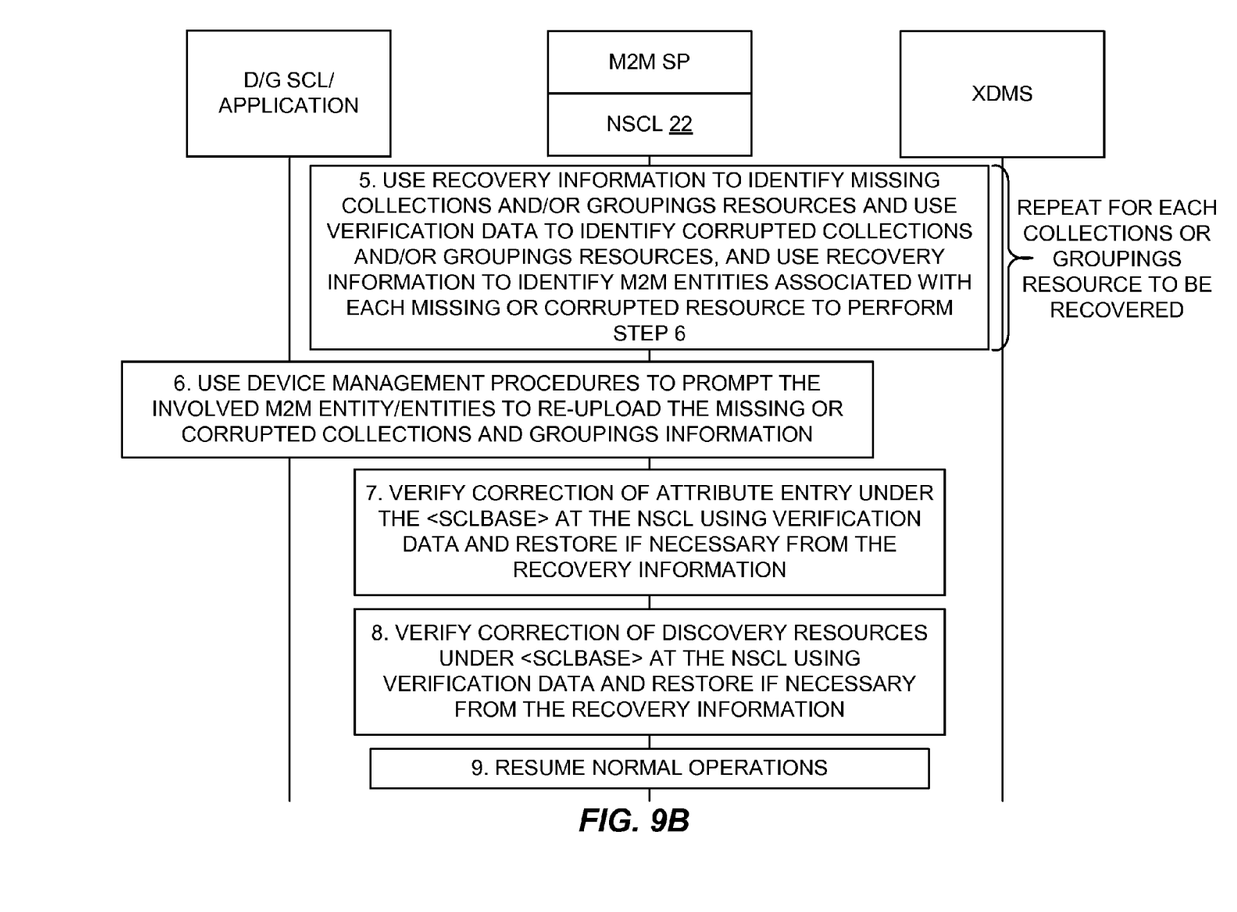

FIGS. 9A and 9B illustrate an example of failure recovery processing, as performed at the NSCL 22 subsequent to an abnormal reset, e.g., after a crash, power failure, etc. At Step 1, the NSCL 22 detects an abnormal reset and at Step 2. it retrieves the recovery information 46 and verification data 48, e.g., it retrieves one or more XML documents representing the recovery information 46 and the verification data 48. At Step 3, the NSCL 22 uses the recovery information 46 to identify resource items that are missing from the (post-reset) M2M resource information 50 at the NSCL 22. Further, for those resource items that were retained by the NSCL 22 through the abnormal reset, the NSCL 22 uses the verification data 48 to identify corrupted resource items.

At Step 4, the NSCL 22 uses device management procedures to recreate (i.e., recover) missing or corrupted registration resources, based on using the entity contact information stored in the recovery information 46 for those registration resource items identified as being either missing or corrupted. It will be understood that the NSCL 22 performs these steps for each missing or corrupted registration resource item.

In FIG. 9B, failure recovery processing continues with Step 5, wherein the NSCL 22 uses the recovery information 46 and the verification data 48 to identify missing or corrupted collections-related and/or groupings-related resource items. In Step 6, the NSCL 22 uses the contact information included in the recovery information 46 to perform device management procedures with respect to the M2M entities identified in the recovery information 46 as being associated with the missing or corrupted resource items. These operations include prompting the involved entities to re-upload the missing or corrupted resource information.

At Steps 7. and 8, the NSCL 22 verifies the restored information for its own data including attribute and discovery resources under the <SCLBase>, e.g., by computing new verification values for the restored resource items and comparing those values against the corresponding verification values stored in the retrieved verification data 48. After verifying/restoring the missing or corrupted information, the NSCL resumes normal operations in Step 9. Of course, such processing also may have exception handling, e.g., to terminate recovery/restoration attempts for unreachable M2M entities, etc.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of failure recovery for a Network Services Capability Layer, NSCL, in a Machine-to-Machine, M2M, network, said method comprising:
   safeguarding M2M resource information at the NSCL, by dynamically maintaining recovery information in a persistent data store, to include identifiers and Point-of-Contact, POC, information for M2M entities that are associated with the M2M resource information; and
   triggering a failure recovery process responsive to detecting an abnormal reset at the NSCL, wherein said failure recovery process includes recovering missing information based on:
      retrieving the recovery information from the persistent data store;
      evaluating the M2M resource information as existing at the NSCL after the abnormal reset with respect to the recovery information, to identify missing M2M resource information; and
      contacting the M2M entities that are indicated by the recovery information as being associated with the missing M2M resource information, to recreate the missing M2M resource information at the NSCL.

2. The method of claim 1, wherein the method further includes dynamically maintaining verification data in the persistent data store for the M2M resource information, based on maintaining verification values for the M2M resource information.

3. The method of claim 2, wherein the failure recovery process further includes recovering corrupted M2M resource information based on:
   retrieving the verification data from the persistent data store;
   evaluating the resource information as existing at the NSCL after the abnormal reset with respect to the verification data, to identify corrupted M2M resource information within the M2M resource information;
   contacting the M2M entities that are indicated by the recovery information as being associated with the corrupted M2M resource information, to recreate the corrupted M2M resource information at the NSCL.

4. The method of claim 2, wherein the verification data comprises individual stored verification values, each corresponding to a respective resource item safeguarded by the recovery information, and wherein evaluating the resource information for recovering corrupted M2M resource information comprises, for each such resource item remaining in the M2M resource information at the NSCL after the abnormal reset, computing a verification value, and identifying the remaining resource item as corrupted when the computed verification value does not match the corresponding stored verification value.

5. The method of claim 1, wherein maintaining the recovery information for the NSCL in the persistent data store comprises maintaining an eXtensible Mark-up Language, XML, document in the persistent data store.

6. The method of claim 5, wherein maintaining the XML document in the persistent data store comprises updating the XML document in the persistent data store on a triggered or periodic basis, so that the recovery information substantially always matches the then-current M2M resource information at the NSCL.

7. The method of claim 5, wherein the persistent data store is included in a second network node that is external to a first network node hosting the NSCL, and wherein maintaining the XML document includes at least one of: posting updated copies of the XML document to the second network node on a triggered or periodic basis, to reflect changes in the M2M resource information at the NSCL; and signaling such changes to the second network node, for use by the second network node in updating the XML document.

8. The method of claim 5, wherein maintaining the XML document in the persistent data store comprises maintaining two or more XML documents that are segregated according to schema or type.

9. The method of claim 8, wherein maintaining two or more XML documents that are segregated according to schema or type comprises maintaining a first XML document for failure recovery with respect to registrations existing at the NSCL at the time of the failure event, and maintaining a second XML document for failure recovery with respect to collections and their corresponding attributes existing at the NSCL at the time of the failure event.

10. The method of claim 1, wherein the M2M resource information comprises any one or more of registration resources, collections and collection attributes resources, and groupings and grouping attribute resources, and wherein the recovery information correspondingly comprises at least one of identifiers and Point-of-Contact, POC, information for applications and SCLs registered at the NSCL, resource identifiers and entity identifiers and POC information for M2M entities, which are associated with collections created or announced at the NSCL, and resource identifiers and entity identifiers and POC information for M2M entities, which are associated with resource groupings at the NSCL.

11. A network node configured to perform failure recovery for a Network Services Capability Layer, NSCL, in a Machine-to-Machine, M2M, network, said network node comprising:
a communication interface configured for exchanging signaling between the NSCL and other M2M entities in the M2M network; and
a processing circuit operatively associated with the communication interface and configured to:
instantiate the NSCL;
safeguard M2M resource information at the NSCL, by dynamically maintaining recovery information in a persistent data store, to include identifiers and Point-of-Contact, POC, information for M2M entities that are associated with the M2M resource information; and
trigger a failure recovery process responsive to detecting an abnormal reset at the NSCL, wherein said failure recovery process includes recovering missing information, based on the processing circuit being configured to:
retrieve the recovery information from the persistent data store;
evaluate the M2M resource information as existing at the NSCL after the abnormal reset with respect to the recovery information, to identify missing M2M resource information; and
contact the M2M entities that are indicated by the recovery information as being associated with the missing M2M resource information, to recreate the missing M2M resource information at the NSCL.

12. The network node of claim 11, wherein the processing circuit is further configured to dynamically maintain verification data in the persistent data store for the M2M resource information, based on maintaining verification values for the M2M resource information.

13. The network node of claim 12, wherein the failure recovery process further includes recovering corrupted M2M resource information, based on the processing circuit being configured to:
retrieve the verification data from the persistent data store;
evaluate the resource information as existing at the NSCL after the abnormal reset with respect to the verification data, to identify corrupted M2M resource information within the M2M resource information;
contact the M2M entities that are indicated by the recovery information as being associated with the corrupted M2M resource information, to recreate the corrupted M2M resource information at the NSCL.

14. The network node of claim 12, wherein the verification data comprises individual stored verification values, each corresponding to a respective resource item safeguarded by the recovery information, and wherein the processing circuit is configured to evaluate the resource information for recovering corrupted M2M resource information by, for each such resource item remaining in the M2M resource information at the NSCL after the abnormal reset, computing a verification value, and identifying the remaining resource item as corrupted when the computed verification value does not match the corresponding stored verification value.

15. The network node of any of claim 11, wherein the processing circuit is configured to maintain the recovery information for the NSCL in the persistent data store by maintaining an eXtensible Mark-up Language, XML, document in the persistent data store.

16. The network node of claim 15, wherein the processing circuit is configured to maintain the XML document in the persistent data store by updating the XML document from the persistent data store on a triggered or periodic basis, so that the recovery information substantially always matches the then-current M2M resource information at the NSCL.

17. The network node of claim 15, wherein the persistent data store is included in a second network node that is external to a first network node hosting the NSCL, and wherein the processing circuit is configured to maintain the XML document based on at least one of: posting updated copies of the XML document to the second network node on a triggered or periodic basis, to reflect changes in the M2M resource information at the NSCL; and signaling such changes to the second network node, for use by the second network node in updating the XML document.

18. The network node of claim 15, wherein the processing circuit is configured to maintain the XML document in the persistent data store by maintaining two or more XML documents that are segregated according to schema or type.

19. The network node of claim 18, wherein the processing circuit is configured to maintain two or more XML documents that are segregated according to schema or type, based on maintaining a first XML document for failure recovery with respect to registrations existing at the NSCL at the time of the failure event, and maintaining a second XML document for failure recovery with respect to collections and their corresponding attributes existing at the NSCL at the time of the failure event.

20. The network node of claim 11, wherein the M2M resource information comprises any one or more of registration resources, collections and collection attributes resources, and groupings resources, and wherein the recovery information correspondingly comprises at least one of: identifiers and Point-of-Contact, POC, information for applications and SCLs registered at the NSCL; resource identifiers and entity identifiers and POC information for M2M entities, which are associated with collections created or announced at the NSCL; and resource identifiers and entity identifiers and POC information for M2M entities, which are associated with resource groupings at the NSCL.

* * * * *